Patented June 13, 1950

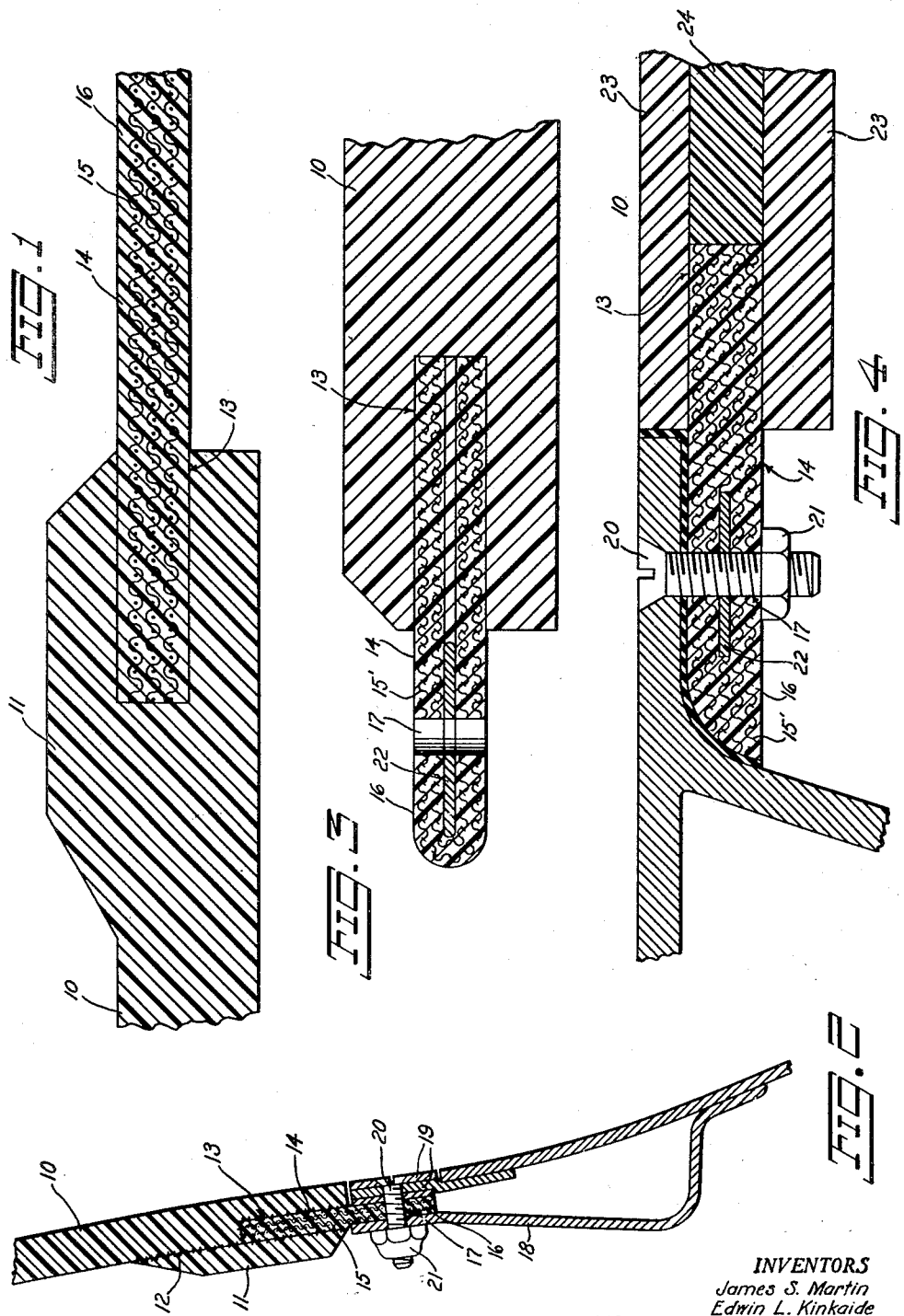

2,511,168

UNITED STATES PATENT OFFICE 2,511,168

CONSTRUCTION AND MOUNTING OF UNITS OF TRANSPARENT SYNTHETIC RESINS

James S. Martin, Centerport, and Edwin L. Kinkaide, Sayville, N. Y., assignors to Republic Aviation Corporation, Farmingdale, N. Y., a corporation of Delaware Application March 30, 1946, Serial No. 658,568

3 Claims. (Cl. 154—43)

1

This invention relates to the construction and mounting of units of transparent synthetic resins, such as sheets, panels and structural components, and proposes a mounting extension or member secured to and projecting from the unit in such manner that for all practical purposes it becomes an integral part thereof and embodies all the favorable characteristics of the unit, at the same time avoiding and eliminating the disadvantages which have heretofore characterized the mounting of elements or units.

Among its other objects the present invention contemplates a synthetic resin construction and mounting means which will eliminate all points of stress concentration and provide a uniform distribution of the forces applied in mounting and securing the unit or structural component and thereby eliminate any tendency of the synthetic resin to craze, chip or fracture.

The character of the mounting extension or member of the instant invention is such that it, for all practical purposes, becomes an integral part of the synthetic resin unit (sheet, panel or structural component) where it directly joins, cooperates with or is engaged by, said unit and yet is so fabricated throughout its entire length that it may be clampingly engaged or pierced by bolts or other fastening means without damage either to the mounting extension or member per se or to the supported or mounted transparent synthetic resin unit with which it coacts.

With the above and other objects in view, as will be apparent, this invention consists in the construction, combination and arrangement of parts all as hereinafter more fully described, claimed and illustrated in the accompanying drawings, wherein:

Fig. 1 is a sectional view through one edge of a panel or structural component of synthetic resin illustrating a mounting member secured thereto and projecting therefrom;

Fig. 2 is a sectional view through a portion of an aircraft structure illustrating a panel or a structural component of transparent synthetic resin made in accordance with the teachings of the present invention fixedly secured thereto;

Fig. 3 is a sectional view at the edge of a panel or structural component of synthetic resin illustrating a modified form of supporting or mounting member projecting therefrom and secured thereto; and Fig. 4 is a section through a synthetic resin panel or structural component formed from laminated sheets to illustrate the present invention applied thereto in securing it to part of an aircraft structure.

Panels, sheets or structural components of synthetic resins have wide adaptation and use especially as transparent closures for openings or as closures generally. These transparent sheets, panels or structural components are used as a substitute for and in lieu of glass, and in the production of aircraft are extensively used as closures, domes, nose sections and for similar purposes. On occasion these elements are subjected to vast differentials in pressure due to altitudes attained in flight and to the internal pressure maintained within the fuselage of the aircraft in excess of the surrounding atmospheric pressure. These differences in pressure vary constantly during flight and are accompanied by radical and rapid changes of temperature.

It is characteristic of synthetic resins, and especially those that are most suitable for use in aircraft that in resisting differentials in pressure and changes in temperature they must be so mounted in or on the aircraft structure that they will not be subjected to stress concentrations or unbalanced forces and thus prevent crazing or rupturing of the synthetic resin. It has also been found to be impractical and also damaging to the synthetic resin even under normal and constant pressure and temperature conditions, to pierce it with holes or other openings for the reception and passage of bolts, rivets or other fastening means employed in the mounting of the unit.

The instant invention proposes a mounting member projecting from the edge of the transparent synthetic resin sheet, panel or structural component which is so secured to the sheet, panel or structural component that it, for all practical purposes, becomes an integral or homogeneous part thereof. This mounting member is so constructed and fabricated that it can be clamped and/or pierced by holes or apertures without affecting either the mounting member or the sheet, panel or component. It will also reinforce the adjoining edge portion of the panel or structural component and support and mount it without injury or damage. While this mounting member embodies the same synthetic resin as that incorporated in the cooperating panel, it is so fabricated that it is reinforced throughout and the inherent objectionable characteristics of the synthetic resin per se are counteracted and overcome.

Reference being made more particularly to the drawings, and especially to Figs. 1 and 2, 10 designates a panel or structural component of synthetic resin having a bead 11 situated over and extending along its edge portion. This bead 11 may be formed integrally with the panel or component 10, as illustrated in Fig. 1, or it may comprise a strip of synthetic resin cemented, as at 12, to one face of the panel or component 10 adjacent its edge as illustrated in Fig. 2. In either event, the bead 11 is or becomes an integral part of the panel or component 10 since the cementing thereof to the edge portion of the panel or component 10 has the effect of producing a homogeneous assembly because the cement employed is compatible and blends or mingles with the synthetic resin of the panel or component 10 and the bead 11. Thus the adjoining surfaces of the bead 11 and panel 10 after being softened by the solvents in the cement are intimately united with the result that while the seam or junction is sometimes visually apparent it has the same strength as, and frequentlygreater strength than, the bodies of the bead and panel. Therefore the seam or junction 12 in its nature and in the resulting structure is similar to a metal weld.

A pocket or socket 13 is formed or created in the edge of the panel or component 10 to underlie the bead 11. This socket 13 may be formed in any suitable manner: if the panel or component 10 and the bead 11 are originally integral, the socket 13 may be routed out, or if the bead 11 and panel 10 are the result or product of fabrication as by cementing the bead 11 to the edge portion of the panel 10, the channel 13 may be formed in one face of the edge portion of the panel 10 after which bead 11 may be cemented or welded in place to constitute one side of the socket while the panel 10 comprises the other side thereof. In either event the result is the same; a socket 13 is created in the edge of a unitary, integral structure comprising the bead 11 and the edge portion of the panel or component 10.

Within this socket 13 is mounted or secured a supporting member 14 comprising a series of laminations 15 of metallic wire mesh or screen superimposed one upon the other and impregnated with the same synthetic resin as is employed in the component or panel 10. Since the same synthetic resin that is used in the panel or component 10 and bead 11 is employed to impregnate the laminated wire mesh or screen sections 15, and as the solvent employed in impregnating the laminations 15 with synthetic resin 16 of the supporting member 14 is also a solvent for the walls of the socket 13 the reinforced or laminated supporting member 14 becomes welded or cemented to the walls defining the socket when inserted therein. Many techniques may be followed in securing the mounting member 14 to and in the beaded edge of the panel or structural component 10 but either of two have been found to be satisfactory. The lamination of the wire or screen sections 15 and the impregnation thereof with the synthetic resin in solution produces a unitary supporting member 14 which may be allowed to set or cure after which that portion thereof that is to be received within the socket 13 may be dipped in the solvent thereby softening the synthetic resin surrounding the mesh or screen sections 15. When so treated and when the walls of the socket 13 are similarly treated the insertion of the member 14 into the socket causes the walls of the socket and the abutting synthetic resin surfaces of the member to blend or intimately adhere. Thus that portion of the supporting member 14 inserted in the channel 13 is bonded or welded to and between the panel or structural component 10 and the bead 11 and becomes, for all intents and purposes, so united therewith that a unitary, homogeneous structure exists throughout the edge portion of the panel or component 10. Alternately the mounting member 14 may be cemented or welded within the socket 13 by inserting it in the socket 13, the walls of which have been previously coated with the solvent before it has completely set or cured after lamination and impregnation. In either event, the result is the same. There are doubtless other methods and techniques by which the mounting member 14 may be secured within the socket 13 and be so secured therein that the synthetic resin of the mounting member becomes one with the synthetic resin surrounding and defining the socket 13 and the two above described are merely given as examples of a generally satisfactory practice.

In Fig. 2 that form of the invention shown in Fig. 1 is disclosed as applied to a structural part of an aircraft. The mounting member 14 of the panel or component 10, beyond the limits of the panel or structural component is pierced by one or more bolt holes 17 and then is inserted between the clamping members 18 and 19 carried by or secured to the aircraft. A bolt 20, having a nut 21, is then passed through each bolt hole in the supporting member 14 and the registering and corresponding apertures in the clamping members 18 and 19. The nut 21 can be tightened upon the bolt 20 to any extent, exerting any desired or necessary pressure upon the projecting end of the mounting member 14 without cracking, crazing or breaking the reinforced mounting member or insert 14 and without having any effect whatever upon the body of the panel or structural component 10.

The structure disclosed in Fig. 3 is substantially identical with that illustrated in Figs. 1 and 2 except that cloth or woven fabric laminations 15' are substituted for the wire mesh or screen sections 15 in the fabrication of the mounting member or insert 14 and a coextensive metallic plate 22 is centrally positioned within that portion of the member or insert 14 projecting and extending beyond the limits of the panel or structural component 10. The holes or apertures 17, in this form of the invention, pass not only through the woven fabric laminations 15' and synthetic resin 16 of the mounting member 14 but also through this metallic plate. Any fabric of such as those woven from cotton, fiber-glass, etc. can be used for the sections 15' of the mounting insert 14 in Fig. 3 but it has been found that fabrics of synthetic resins are particularly well adapted for that purpose.

The present invention can be applied to any type of synthetic resin suitable for the purposes and construction of the panel or structural component 10 but it is primarily designed to employ a thermoplastic synthetic resin such as acrylic or methyl methacrylate resin commonly known by and procurable on the open market under the trade-names "Lucite" or "Plexiglas." While this type of resin has been found to be especially suitable to the aircraft closures, nose sections and the like it has also been found to be peculiarly sensitive to unbalanced forces or to stress concentrations as well as to variations in pressure and temperature which react unfavorably thereon. Where acrylate resins are employed any suitable solvent such as acetone may be used for the lamination and impregnation of the mounting member or insert 14 and the mounting member 14 may be secured within the socket 13 by having that portion thereof to be received in the socket treated with acetone prior to its insertion therein and as a precautionary measure, the sides and bottom of the socket may also be previously treated with the acetone. As above pointed out, when the mounting member or insert 14 is situated within the socket 13 the softened walls of the socket blend and mingle with the softened corresponding surfaces of that portion of the mounting member situated within the socket 13 so that the entire assembly constitutes a unitary, homogeneous structure after the solvent evaporates and the assembly sets or cures.

The present invention can be incorporated in and applied to panels of laminated synthetic resin sheets, which are obtainable on the open market as a standard article of commerce. This type of panel or component 10 comprises the transparent sheets 23 bonded together with an intervening layer 24 of vinyl acetal, such as polymerized vinyl butyral. As the acrylic resins of the sheets 23 are transparent and the intervening bonding layer 24 being also of a clear transparency after the bonding thereof with the sheets 23, they combine to produce a shatter-proof clear or transparent unitary panel or component 10. It has been found that it is the better practice to employ a supporting member or insert 14 impregnated or laminated with and largely composed of the same acrylic resins as the sheets 23 of the panel or structural component 10 for the purpose of mounting and supporting the latter. Therefore, the present invention is applied to or embodied in commercial laminated acrylic sheets or panels, as shown in Fig. 4, by routing out or otherwise removing that portion of the intervening or bonding layer 24 adjacent the edges of the panel 10 and positioning a mounting member or insert 14 between the edge portions of the sheets 23 where it is there secured and attached as above described and as shown in Fig. 4. This type of mounting member 14 may be formed with either the fabric lamination 15' or with the metallic wire mesh or screen laminations 15, but the resin impregnating these laminations is always the same resin that is employed to produce the sheets 23.

Thus, when the mounting member 14 is inserted between the edge portions of the sheets 23 where the intervening or bonding layer has been routed out, the resin thereof upon curing or setting becomes practically integral with the resin of the sheets 23. In other words, at the edge portions of the sheets 23, where the mounting member is inserted, the sheets 23 and the insert 14 comprise a homogeneous body of an acrylic resin, while inwardly of the edge portions, the outer sheets 23 are of one resin while the bonding or intervening layer 24 comprises another resin.

From the foregoing it is evident that the present invention in its broader aspects resides in a reinforced mounting member of synthetic resin inserted within or between flanking elements of a panel or structural component, the same resin being used in the fabrication of both members or elements aforesaid, where the member or insert is cemented or welded to the panel by softening the resin of both with a suitable solvent and thereby producing complete blending or mingling of the adjacent surfaces of the resin elements and member. Stated differently the instant invention primarily resides in a reinforced mounting member which takes all of the stresses and loads and which is so united with the supported panel or component that the entire area of the union consists of a homogeneous mass of the same synthetic resin throughout.

It is to be understood that the use of the word "panel" herein is to include and define all types of commercial laminated synthetic resin sheets or plates as well as all and various panels or structural components made of synthetic resins and that unless otherwise specified, the term "synthetic resin" in the claims is intended to include and define all suitable and adaptable synthetic resins and all similar or equivalent materials. Where "socket" is used it is intended to define any cavity in the edge or face of the panel for the reception of the mounting member 14.

What is claimed is:

1. An aircraft closure comprising a transparent body consisting of a single sheet of acrylic resin and a mounting portion having a thickness less than that of the body formed of multiple layers of woven wire cloth impregnated with and bonded by acrylic resin, a part of the mounting portion being embedded edgewise in the margin of the body with the resin of the mounting portion integral with the resin of the body and the remainder of the mounting portion projecting beyond the body.

2. An aircraft closure comprising a body consisting of a single thickness of clear acrylic resin having its margin substantially thicker than the remainder of the body and a mounting portion formed of multiple coextensive layers of woven wire cloth impregnated with and bonded by acrylic resin, the thickness of the mounting portion being less than that of the margin of the body and part of the mounting portion being embedded edgewise in the margin of the body with the resin thereof integral with that of the body to create a unitary and homogeneous margin for the closure and the remainder of the mounting portion forming a reduced integral extension projecting beyond the margin of the body.

3. A closure comprising a body consisting of a sheet of acrylic resin having its margin substantially thicker than the remainder of the sheet, and a relatively narrow mounting portion formed of fabric impregnated with and bonded by acrylic resin and having a thickness less than that of the margin of the sheet, a part of the width of said mounting portion being embedded edgewise in the margin of the sheet with the resin thereof integrally united with the resin of the margin of the sheet and the remainder of the mounting portion projecting outwardly from and beyond the edge of the margin of the sheet.

JAMES S. MARTIN.
EDWIN L. KINKAIDE.

REFERENCES CITED

The following references are of record in the file of this patent:

UNITED STATES PATENTS

| Number | Name | Date |
| --- | --- | --- |
| 1,309,758 | Kempton | July 15, 1919 |
| 1,715,702 | Gordon | June 4, 1929 |
| 1,777,309 | Hopkinson | Oct. 7, 1930 |
| 2,322,582 | Marini | June 22, 1943 |
| 2,374,056 | Watkins | Apr. 17, 1945 |
| 2,387,227 | Anderson et al. | Oct. 23, 1945 |
| 2,403,060 | Downes | July 2, 1946 |